(12) United States Patent
Iwatani

(10) Patent No.: US 8,820,297 B2
(45) Date of Patent: Sep. 2, 2014

(54) CONTROL DEVICE FOR INTERNAL COMBUSTION ENGINE

(75) Inventor: Kazuki Iwatani, Susono (JP)

(73) Assignee: Toyota Jidosha Kabushiki Kaisha, Aichi-ken (JP)

(*) Notice: Subject to any disclaimer, the term of this patent is extended or adjusted under 35 U.S.C. 154(b) by 409 days.

(21) Appl. No.: 13/384,495

(22) PCT Filed: May 12, 2011

(86) PCT No.: PCT/JP2011/060959
§ 371 (c)(1),
(2), (4) Date: Jan. 17, 2012

(87) PCT Pub. No.: WO2012/153418
PCT Pub. Date: Nov. 15, 2012

(65) Prior Publication Data
US 2012/0285420 A1    Nov. 15, 2012

(51) Int. Cl.
F02D 13/02    (2006.01)
F02D 23/00    (2006.01)
F02D 41/14    (2006.01)
F02D 21/08    (2006.01)

(52) U.S. Cl.
USPC ............................ 123/348; 701/105; 701/108

(58) Field of Classification Search
CPC .............. F02D 41/401; F02D 41/0002; F02D 41/2467; F02D 2041/001; F02M 25/0707; F02M 25/0756; F01L 1/12; F01L 13/065; F01L 13/06; B60W 10/06
USPC ......... 701/101–105, 108; 123/321, 322, 90.1, 123/90.15, 345–348, 559.1, 559.2, 568.11, 123/568.21
See application file for complete search history.

(56) References Cited

U.S. PATENT DOCUMENTS

| | | | |
|---|---|---|---|
| 6,840,235 B2* | 1/2005 | Koseki et al. | 123/568.14 |
| 8,495,992 B2* | 7/2013 | Roth | 123/568.13 |
| 2006/0021595 A1* | 2/2006 | Miyashita | 123/299 |
| 2007/0198163 A1 | 8/2007 | Yasui et al. | |
| 2007/0235011 A1* | 10/2007 | Easley et al. | 123/568.13 |
| 2009/0266345 A1* | 10/2009 | Sasaki et al. | 123/568.22 |
| 2010/0204903 A1* | 8/2010 | Nakatani et al. | 701/103 |
| 2010/0204907 A1 | 8/2010 | Nakatani et al. | |

FOREIGN PATENT DOCUMENTS

| | | |
|---|---|---|
| JP | 2004-092471 A | 3/2004 |
| JP | 2004-285850 A | 10/2004 |
| JP | 2005-171793 A | 6/2005 |
| JP | 2005-214153 A | 8/2005 |
| JP | 2005-299424 A | 10/2005 |
| JP | 2007-085211 A | 4/2007 |
| JP | 2008-128141 A | 6/2008 |
| JP | 2009-041485 A | 2/2009 |

* cited by examiner

*Primary Examiner* — John Kwon
*Assistant Examiner* — Johnny H Hoang
(74) *Attorney, Agent, or Firm* — Sughrue Mion, PLLC

(57) ABSTRACT

A control device for an internal combustion engine includes: a variable valve timing portion changing a phase of opening and closing of each of an intake valve and an exhaust valve into a target phase; an EGR valve adjusting an exhaust gas recirculation amount recirculated from an exhaust side to an intake side; a supercharging efficiency control portion controlling a supercharging efficiency of a supercharger; a throttle valve adjusting an intake air amount; and the internal combustion engine feedback-controls at least two of the EGR valve, the supercharging efficiency control portion, and the throttle valve, and feedforward-controls the variable valve timing portion.

6 Claims, 9 Drawing Sheets

CONTROL DEVICE FOR INTERNAL COMBUSTION ENGINE

CROSS REFERENCE TO RELATED APPLICATIONS

This application is a National Stage of International Application No. PCT/JP2011/060959 filed May 12, 2011, the contents of all of which are incorporated herein by reference in their entirety.

TECHNICAL FIELD

The present invention relates to a control device for an internal combustion engine.

BACKGROUND ART

Conventionally, there is known a feedback control (hereinafter referred to as F/B control) that brings a physical value influencing the combustion of the internal combustion engine closer to a suitable value (target value) corresponding to a driving state. There are objects to be F/B controlled, such as an opening degree of a throttle valve, a supercharging efficiency of a supercharger (turbocharger), an opening degree of an EGR valve of an exhaust gas recirculation (EGR) device, and a phase of opening and closing of each of an intake valve and an exhaust valve in a variable valve timing mechanism.

Recently, it is requested to concurrently perform plural F/B control processes in order to further reduce the fuel consumption and the emission of the internal combustion engine. It is known that control processes interfere with each other when the objects are F/B controlled concurrently. For example, a supercharging efficiency of the turbocharger is changed to bring the supercharging pressure closer to a target value, whereby an EGR amount is changed even when an opening degree of the EGR valve is constant. Also, an opening degree of the EGR valve is changed to bring the EGR amount closer to a target value, whereby a supercharging pressure is changed even when the supercharging efficiency of the turbocharger is constant. In this way, when the objects are F/B controlled in parallel, the F/B control influence each other. It is thus difficult for the F/B control to converge.

As a technique where the objects are F/B controlled in parallel, Patent Document 1 discloses a technique where control values of two control inputs are calculated by a response designating algorithm commonly using the same given linear function, and the F/B control of the internal combustion engine is performed based on the calculation result to improve stability of the F/B control.

Also, Patent Document 2 discloses a technique that may relate to the present invention.

PRIOR ART DOCUMENT

Patent Document

[Patent Document 1] Japanese Patent Application Publication No. 2005-299424
[Patent Document 2] Japanese Patent Application Publication No. 2004-92471

SUMMARY OF THE INVENTION

Problems to be Solved by the Invention

An increase in the number of the objects to be F/B controlled in internal combustion engine leads the control algorithm to be exponentially complicated. This greatly increases a time for confirmation and conformity. Also, when the control algorithm is programmed in a state where the number of the confirmation patterns is insufficient, the control processes interfere with each other in an unconfirmed driving state. This may cause hunting, overshooting, or undershooting, so that the F/B control may not converge. As described above, an increase in the number of the objects to be F/B controlled in the internal combustion engine may make it difficult to suitably achieve the F/B control.

On the other hand, there is known the feedforward control (hereinafter referred to as F/F control) which estimates disturbance changing the output of the internal combustion engine and which beforehand controls a physical value to cancel the disturbance. Such an F/F control is not influenced by another control of the internal combustion engine. Thus, the F/B control is partially changed into the F/F control, whereby the plural control processes are performed in parallel.

Herein, the control of the supercharging efficiency of the turbocharger greatly contributes to the combustion of the internal combustion engine, and the variation in the response thereof is large. It is thus desirable to perform the F/B control of the supercharging efficiency of the turbocharger. However, in the control of the supercharging efficiency of the turbocharger, a time lag between when the physical value changes and when the combustion is improved is longer than that in the other control. Therefore, even when the other objects are F/F controlled, the supercharging efficiency of the turbocharger is F/B controlled so that the control processes interfere with each other. This may degrade the fuel consumption and the emission of the internal combustion engine.

The present invention has been made in view of the above circumstances and has an object to provide a control device for an internal combustion engine that suppresses plural control processes from interfering with each other.

Means for Solving the Problems

In order to achieve the above object, a control device for an internal combustion engine according to the present invention including: a variable valve timing portion changing a phase of opening and closing of each of an intake valve and an exhaust valve into a target phase; an EGR valve adjusting an exhaust gas recirculation amount recirculated from an exhaust side to an intake side; a supercharging efficiency control portion controlling a supercharging efficiency of a supercharger; a throttle valve adjusting an intake air amount; and the internal combustion engine feedback-controls at least two of the EGR valve, the supercharging efficiency control portion, and the throttle valve, and feedforward-controls the variable valve timing portion, characterized in that the feedforward control changes the target phase of the variable valve timing portion based on a driving state of the internal combustion engine, and restricts a change rate of the target phase based on convergence states of the feedback control of at least two of the EGR valve, the supercharging efficiency control portion, and the throttle valve.

In the control changing the phase of the opening and the closing of the intake valve and the exhaust valve of the variable valve timing portion, a time lag between when a physical value changes and when the combustion is improved is smaller than that in another control. For this reason, the feedforward control restricts the change rate of the target phase of the variable valve timing portion based on the convergence state of the other feedback control having a long time lag between when the physical value changes and when the combustion is improved, thereby suppressing the plural control processes from interfering with each other.

In particularly, in the control device for the internal combustion engine according to the present invention, the internal combustion engine may feedback-control the EGR valve and the supercharging efficiency control portion, and the feedforward control may restrict the change rate of the target phase based on the convergence states of the feedback control of the EGR valve and the supercharging efficiency control portion.

In the adjustment control of the exhaust gas recirculation amount by the EGR valve and the control of the supercharging efficiency by the supercharging efficiency control portion, each time lag between when the physical value changes and when the combustion is improved is larger than that in the other control. For this reason, the feedforward control restricts the change rate of the target phase based on convergence states of the feedback control of the EGR valve and the supercharging efficiency control portion, thereby suppressing the plural control processes from interfering with each other.

Also, in the control device for the internal combustion engine according to the present invention, the internal combustion engine may feedback-control the supercharging efficiency control portion based on a supercharging efficiency feedback proportional term which is proportional to a deviation between a target supercharging pressure and an actual supercharging pressure, and based on a supercharging efficiency feedback integral term which is a learning value of a control based on the supercharging efficiency feedback proportional term, and the feedforward control may restrict the change rate of the target phase based on the supercharging efficiency feedback proportional term or the supercharging efficiency feedback integral term.

In the control of the supercharging efficiency by the supercharging efficiency control portion, the time lag between when the physical value changes and when the combustion is improved is larger than that in the other control. For this reason, the variable valve timing portion is feedforward controlled based on the proportional term or the integral term directly used for the feedback control of the supercharging efficiency control portion, whereby the feedback control and the feedforward control suitably cooperate with each other. It is therefore possible to suppress the plural control processes from interfering with each other.

Further, in the control device for the internal combustion engine according to the present invention, the feedforward control may prohibit the target phase from changing, when the supercharging efficiency feedback proportional term is greater than a first threshold and the supercharging efficiency feedback integral term is smaller than a second threshold.

With the above arrangements, the feedforward control of the variable valve timing portion can be performed in consideration of response delay of the supercharging pressure occurring at an initial time of the feedback control of the supercharging efficiency control portion. This makes the feedback control of the supercharging efficiency control portion and the feedforward control of the variable valve timing portion suitably cooperate with each other. It is thus possible to suppress the plural control processes from interfering with each other.

Furthermore, in the control device for the internal combustion engine according to the present invention, the internal combustion engine may feedback-control the EGR valve to change an actual opening degree of the EGR valve based on a reference opening degree which is changed with a deviation between a target EGR rate and an actual EGR rate, and the feedforward control may restrict the change rate of the target phase based on the deviation between the target EGR rate and the actual EGR rate or the deviation between the reference opening degree of the EGR valve and the actual opening degree of the EGR valve.

With the above arrangements, the feedforward control of the variable valve timing portion and the feedback control of the EGR valve suitably cooperate with each other, the feedback control of the EGR valve having a large time lag between when the physical value changes and when the combustion is improved. It is therefore possible to suppress the plural control processes from interfering with each other.

Moreover, in the control device for the internal combustion engine according to the present invention, the feedforward control may reduce the change rate of the target phase as the deviation between the target EGR rate and the actual EGR rate of the internal combustion engine or as the deviation between the reference opening degree of the EGR valve and the actual opening degree of the EGR valve is greater.

With the above arrangements, the feedforward control of the variable valve timing portion can be performed in consideration of the individual difference of the EGR valve and the variation in responses by deterioration thereof. This makes the feedback control of the EGR valve and the feedforward control of the variable valve timing portion suitably cooperate with each other. It is thus possible to suppress the plural control processes from interfering with each other.

Effects of the Invention

According to the present invention, it is possible to suppress plural control processes from interfering with each other.

MODES FOR CARRYING OUT THE INVENTION

A following description will be given of an embodiment according to the present invention in detail with reference to drawings.

Embodiment

Figure 1:
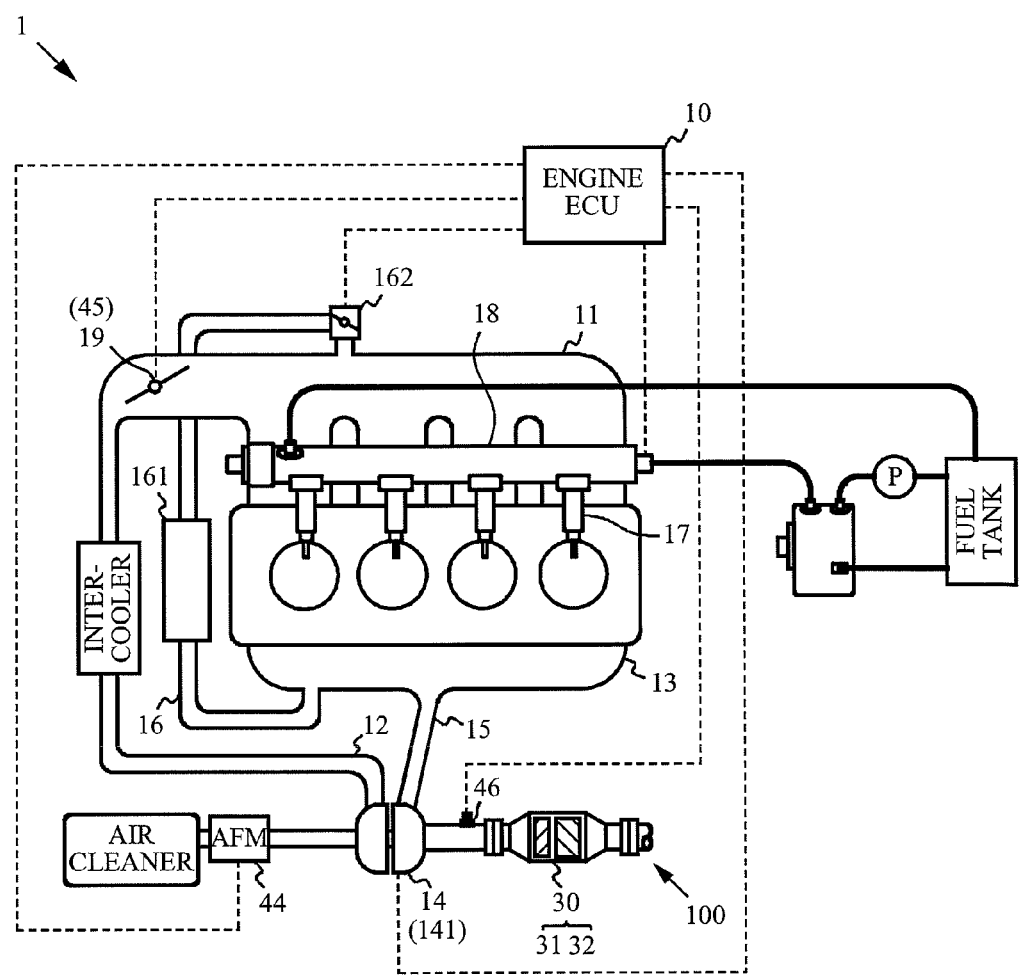
FIG. 1 is a view of a configuration example of an engine system according to an embodiment.

A description will be given of embodiments according to the present invention with reference to drawings. FIG. 1 is a view of a configuration example of an engine system 1 including a control device for an internal combustion engine according to the present invention. Additionally, FIG. 1 partially illustrates the engine.

The engine system 1 illustrated in FIG. 1 includes an engine 100 as a power source, and an engine electronic control unit (ECU) controlling the driving of the engine 100 in a unified manner. Also, the engine system 1 includes a diesel throttle 19 at an intake path 12 of the engine 100. Also, the engine system 1 includes a turbocharger 14 at a downstream side of an exhaust manifold 13 of the engine 100, and a variable nozzle vane mechanism 141 for controlling a supercharging efficiency of the turbocharger 14. Further, the engine system 1 includes an EGR path 16 connecting between an exhaust side and an intake side of the engine 100, and an EGR valve 162 adjusting an amount of EGR gas recirculated through the EGR path 16. Furthermore, the engine system 1 includes an electric VVT mechanism 26 and a hydraulic VVT mechanism 27 changing valve timings of an intake valve 22 and an exhaust valve 23, respectively.

Figure 2:
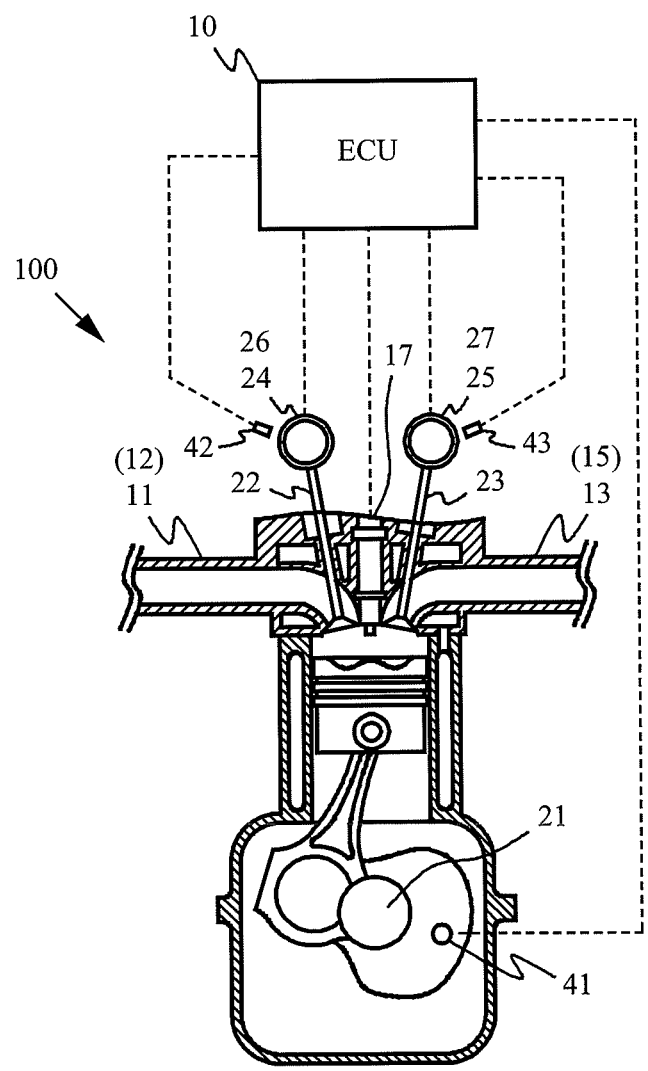
FIG. 2 is a sectional view of a configuration example of a cylinder of the engine according to the embodiment.

FIG. 2 is a sectional view of a configuration example of a cylinder of the engine 100 according to the embodiment. The engine 100 is a diesel engine having four cylinders installed in a vehicle, and each cylinder includes a piston defining a combustion chamber. The piston of each combustion chamber is slidably fitted into the cylinder of the engine 100, and is connected to a crank shaft 21 which is an output shaft member through a connecting rod.

An engine ECU 10 determines a fuel injection amount and an injection timing based on information on an intake air amount detected by an airflow meter 44 and information on a piston position and the like detected by a crank angle sensor 41, and sends signals to an injector 17. The injector 17 ejects the fuel of an instructed injection amount into the combustion chamber at an instructed injection timing in response to signals from the engine ECU 10. The fuel ejected by the injector 17 is changed into fog in the combustion chamber, and forms the mixture gas together with the intake air that flows into the combustion chamber room in response to the opening of the intake valve. Subsequently, the mixture gas is compressed and fired in the combustion chamber by the upstroke of the piston, and expands the combustion room to move down the piston. Because this down stroke is changed into an axial rotation of the crank shaft 21 through the connecting rod, the engine 100 outputs power. In this case, the engine 100 is not limited to the diesel engine with four cylinders, and is applicable to a diesel engine with multiple cylinders. Also, the engine 100 of the present embodiment is the diesel engine using light oil as fuel, but not limited to this. Additionally, the engine 100 is an example of an internal combustion engine according to the present invention.

The crank angle sensor 41 is provided near an axis of the crank shaft 21. The crank angle sensor 41 detects a rotational angle of the axis of the crank shaft 21, and sends a detection result to the engine ECU 10. Therefore, the engine ECU 10 obtains information on a crank angle such as a rotational number and a rotational angular velocity of the axis of the crank shaft 21 in the driving state. Moreover, the engine ECU 10 calculates an engine rotational number and an engine torque based on the obtained rotational number and rotational angular velocity of the axis of the crank shaft 21, and then recognizes the output of the engine 100.

Plural intake and exhaust valves are installed in each combustion chamber. FIG. 2 illustrates an intake valve and an exhaust valve. The intake valve 22 is arranged in each inlet port of the combustion chamber, and an intake camshaft 24 for opening and closing the intake valves 22 is arranged.

Further, the exhaust valve 23 is arranged in each exhaust port of the combustion chamber, and an exhaust camshaft 25 is arranged for opening and closing the exhaust valves 23.

The intake valve 22 and the exhaust valve 23 are respectively opened or closed in response to the rotation of the intake camshaft 24 and the exhaust camshaft 25 into which the rotation of the crank shaft 21 is transmitted by a connecting mechanism (for example, a timing belt or a timing chain) The intake valve 22 connects or disconnects between the intake port and the combustion chamber, and the exhaust valve 23 connects/disconnects the exhaust port and/from the combustion chamber. Additionally, the phases of the intake valve 22 and the exhaust valve 23 are indicated by a crank angle as a reference.

The intake camshaft 24 includes the electric VVT mechanism 26 as a variable valve timing mechanism (hereinafter referred to as VVT mechanism). This electric VVT mechanism 26 rotates the intake camshaft 24 by an electric motor in response to instructions from the engine ECU 10. Because this changes the rotational phase of the intake camshaft 24 relative to the crank shaft 21, a valve timing of the intake valve 22 is changed. In this case, the rotational phase of the intake camshaft 24 is detected by an intake cam angle sensor 42, and is then output to the engine ECU 10. Therefore, the engine ECU 10 can obtain the phase of the intake camshaft 24 and the phase of the intake valve 22. Also, the phase of the intake camshaft 24 is indicated by a crank angle as a reference. Additionally, the electric VVT mechanism 26 is an example of a variable valve timing portion of the present invention.

The exhaust camshaft 25 includes the hydraulic VVT mechanism 27. This hydraulic VVT mechanism 27 rotates the exhaust camshaft 25 by an oil control valve (hereinafter referred to as OCV) in response to the instructions from the engine ECU 10. Because this changes the rotational phase of the exhaust camshaft 25 relative to the crank shaft 21, a valve timing of the exhaust valve 23 is changed. In this case, the rotational phase of the exhaust camshaft 25 is detected by an exhaust cam angle sensor 43, and is then output to the engine ECU 10. Therefore, the engine ECU 10 can obtain the phase of the exhaust camshaft 25 and the phase of the exhaust valve 23. Also, the phase of the exhaust camshaft 25 is indicated by a crank angle as a reference. Additionally, the hydraulic VVT mechanism 27 is an example of a variable valve timing portion of the present invention.

Returning to FIG. 1, the engine 100 includes a common rail fuel injection system composed of the injector 17, a common rail 18, a low-pressure fuel pump, and a high-pressure fuel pump. The fuel pumped from a fuel tank by the low-pressure fuel pump is ejected at a high pressure into the common rail 18 by the high-pressure fuel pump, and is then accumulated.

The common rail 18 is a container for accumulating the high-pressure fuel that is supplied to the injector 17. The fuel pressure-fed by the high-pressure fuel pump is accumulated in the common rail 18 to have a pressure that is necessary for ejection, and is then supplied to the injector 17 of each combustion chamber through a high pressure pipe. Also, a rail pressure sensor and a reducing pressure valve are installed in the common rail 18. The engine ECU 10 instructs the reducing pressure valve to open, when the fuel pressure within the common rail 18 output from the rail pressure sensor is greater than a rated value. The fuel is discharged from the reducing pressure valve, so that the common rail pressure is always adjusted to be equal to or lower than a rated value. The fuel discharged from the reducing pressure valve returns to the fuel tank through a relief pipe.

The injector 17 is installed in each combustion chamber. The fuel supplied from the common rail 18 through the high-pressure pipe is ejected and supplied into the combustion chamber of the engine cylinder by the injector 17 based on the instructions from the engine ECU 10. The engine ECU 10 determines a fuel injection amount and an injection timing based on information on an intake air amount from the airflow meter 44 and information on the piston position from the crank angle sensor 41 and the like, and sends signals to the injector 17. The injector 17 ejects the fuel with the high pressure and the instructed injection amount into the combustion chamber at an instructed injection timing in response to signals from the engine ECU 10. The leak fuel from the injector 17 returns to the fuel tank through the relief pipe. In this case, the injector 17 may be installed at any position of the combustion chamber depending on the specification of the engine 100.

An intake manifold 11 is connected to each combustion chamber of the engine 100. The intake manifold 11 is connected to an air cleaner through the airflow meter 44, the diesel throttle 19, an inter cooler, and a compressor of the turbocharger 14 by the intake path 12, and introduces the intake air from the outside of the engine 100 into each combustion chamber.

A throttle position sensor 45 is installed in the diesel throttle 19. The airflow meter 44 and the throttle position sensor 45 respectively detect an amount of the intake air flowing in the intake path 12 and an opening degree of the diesel throttle 19, and then send the detection results to the engine ECU 10. The engine ECU 10 recognizes the intake air amount introduced into the intake manifold 11 based on the sent detection results, and adjusts the opening degree of the diesel throttle 19 to introduce the intake air that is necessary for driving the engine 100. It is preferable that the diesel throttle 19 should be a throttle by wire type using a step motor, but may be another mechanism that can change a valve opening degree of the diesel throttle 19 into any degree. Additionally, the diesel throttle 19 is an example of the throttle valve according to the present invention.

Further, the exhaust manifold 13 is connected to each combustion chamber of the engine 100. The exhaust manifold 13 is connected to an exhaust gas purification device 30 through an exhaust turbine of the turbocharger 14 by an exhaust path 15, and exhausts the combusted exhaust gas to the outside of the engine 100.

The turbocharger 14 rotates the exhaust turbine by use of the kinetic energy of the exhaust gas, and compresses and introduces the intake air flowing through the air cleaner into an intercooler. The compressed intake air is introduced into the intake manifold 11 after being cooled in the intercooler.

The turbocharger 14 is a variable nozzle type turbocharger (variable nozzle turbo, hereinafter referred to as VNT), and is provided with a variable nozzle vane mechanism 141 at the exhaust turbine side. The adjustment of the opening degree of the variable nozzle vane mechanism 141 controls an angle of the exhaust gas flowing toward a turbine impeller blade so as to adjust the supercharging pressure of the intake air introduced into the intake manifold 11. For example, a further reduction in the opening degree of the variable nozzle vane mechanism 141 further increases the exhaust gas flowing toward the turbine impeller blade, so that the energy efficiency of the exhaust gas increases and then the supercharging efficiency improves. Also, a further increase in the opening degree of the variable nozzle vane mechanism 141 further reduces the exhaust gas flowing toward the turbine impeller blade, so that the energy efficiency of the exhaust gas is reduced and the supercharging efficiency is reduced. In this case, the turbocharger 14 is not limited to the VNT, and may adjust the supercharging pressure (control of the energy efficiency of the exhaust gas) by a wastegate. Additionally, the turbocharger 14 is an example of a supercharger according to the present invention. Further, the variable nozzle vane mechanism 141 is an example of a supercharging efficiency control portion according to the present invention.

The exhaust gas purification device 30 purifies the exhuast gas of the engine 100, and includes: a purification catalyst 31 purifying NOx, HC, and CO; and a DPF 32 collecting PM (particulate matters) such as soot. In this case, the exhaust gas purification device 30 may be a diesel particlate NOx reduction system (DPNR) combining a particulate filter and a NOx strage reduction catalyst.

An A/F sensor 46 for detecting the air-fuel ratio of the engine 100 is provided in the exhaust path 15 at the upstream side of the exhaust gas purification device 30. Therefore, the engine ECU 10 can recognize the air-fuel ratio of the engine 100 in various load states.

The exhaust manifold 13 is connected to the intake manifold 11 through the EGR path 16. The exhaust gas flows into the EGR path 16, is cooled in an EGR cooler 161, flows toward the intake manifold 11 while the flow rate of the exhaust gas is being adjusted by the EGR valve 162, and is introduced into the combustion chamber with the intake air. The EGR valve 162 adjusts its opening degree in response to the instructions from the engine ECU 10 to suitably adjust the recirculation amount of the exhaust gas flowing toward the intake manifold 11. Thus, the EGR gas having a suitable amount corresponding to the driving state is recirculated and supplied to the intake manifold 11, thereby reducing the combustion temperature in the engine 100 and reducing the NOx emission. Additionally, the EGR valve 162 is an example of an EGR valve according to the present invention.

The engine ECU 10 is a computer including: a central processing unit (CPU) performing arithmetic processing; a read only memory (ROM) storing programs or the like; and a random access memory (RAM) or a non-volatile RAM (NVRAM) storing data or the like. The engine ECU 10 reads the detection results from the plural sensors installed at parts of the engine 100, and comprehensively controls the driving operation of the engine 100 based on the detection results.

In particular, the engine ECU 10 performs the F/B control which brings a physical value influencing the combustion of the engine 100 closer to a suitable value (target value) corresponding to the driving state. Specifically, the engine ECU 10 performs the F/B control on the diesel throttle 19, the variable nozzle vane mechanism 141, and the EGR valve 162. Also, the engine ECU 10 performs the F/F control which estimates disturbance changing the output of the engine 100 and which controls the physical value to beforehand cancel the estimated disturbance. Specifically, the engine ECU 10 performs the F/F control which controls the electric VVT mechanism 26 and the hydraulic VVT mechanism 27.

In this way, a part of the F/B control by the engine 100 is changed to the F/F control, thereby preventing hunting, overshooting, or undershooting caused by the interference of plural control processes with each other.

Also, the engine ECU 10 performs the F/F control of the electric VVT mechanism 26 and the hydraulic VVT mechanism 27 based on the convergence states of the F/B control of the variable nozzle vane mechanism 141 and the EGR valve 162. A description will be given of the F/B control and the F/F control performed by the engine ECU 10 below.

Figure 3:
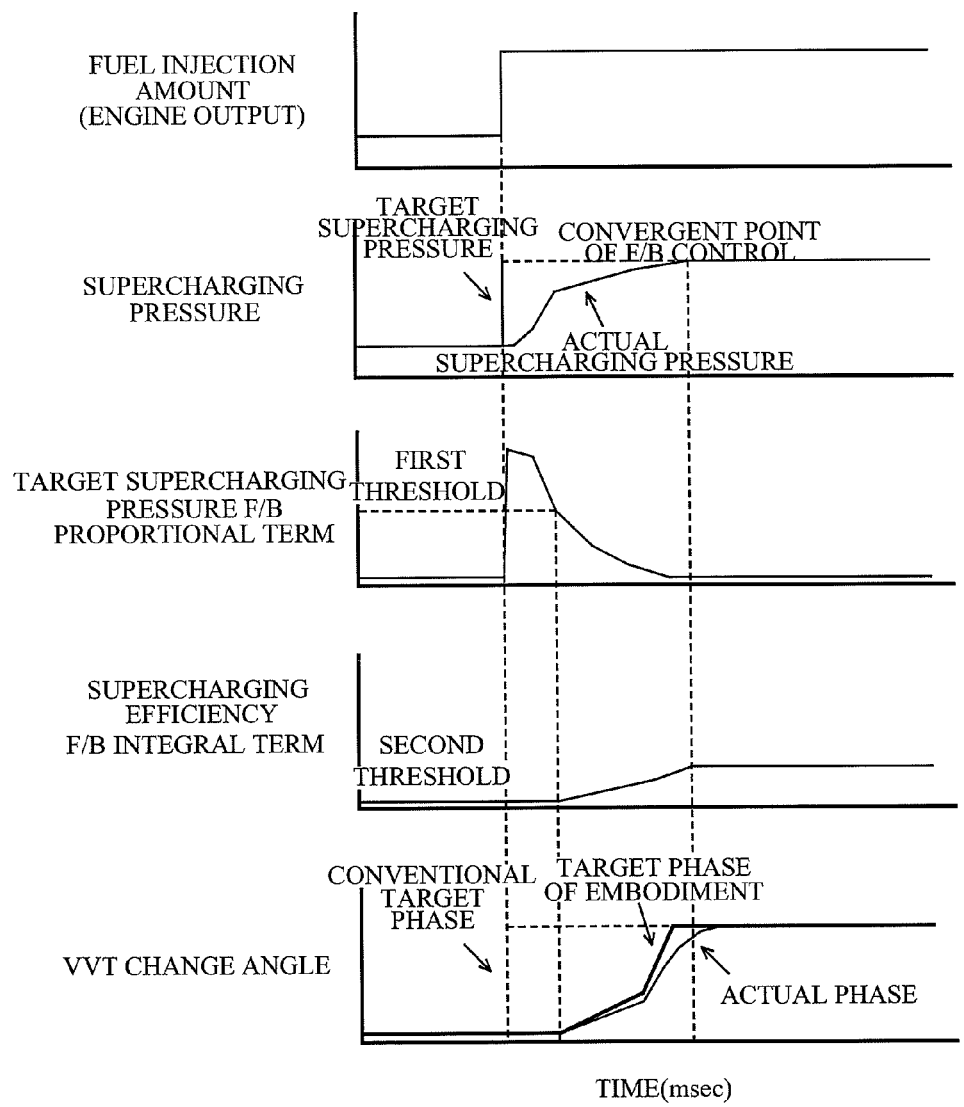
FIG. 3 is a view of an example of F/F control of an electric VVT mechanism and a hydraulic VVT mechanism based on F/B control of a variable nozzle vane mechanism.

Firstly, a description will be given of the F/B control of the variable nozzle vane mechanism 141 in the engine system 1 according to the present embodiment, and the F/F control of the electric VVT mechanism 26 and the hydraulic VVT mechanism 27. FIG. 3 illustrates an example of the F/F control of the electric VVT mechanism 26 in response to the F/B control of the variable nozzle vane mechanism 141 and the hydraulic VVT mechanism 27.

When the output of the engine 100 is requested to be changed, for example, when the vehicle accelerates or runs up a slope, the engine ECU 10 calculates the target values of the fuel injection amount, the supercharging pressure, and the valve timings of the intake valve 22 and the exhaust valve 23 based on the requested outputs. Subsequently, the engine ECU 10 controls the injector 17, the variable nozzle vane mechanism 141, the electric VVT mechanism 26, and the hydraulic VVT mechanism 27 based on the calculated target values.

In the present embodiment, the opening degree of the variable nozzle vane mechanism 141 is adjusted by PI control using a proportional term (proportional) and a integral term (integral), thereby performing the F/B control which brings the supercharging pressure of the engine 100 closer to the target value. Firstly, when the output of the engine 100 is requested to be changed, the engine ECU 10 sets the proportional term (hereinafter referred to as supercharging efficiency feedback proportional term) that is proportional to the deviation between the target supercharging efficiency and the actual supercharging pressure. Subsequently, the engine ECU 10 adjusts the opening degree of the variable nozzle vane mechanism 141 based on the set supercharging efficiency feedback proportional term, and adjusts the supercharging efficiency of the turbocharger 14 to control the supercharging pressure. The engine ECU 10 updates the supercharging efficiency feedback proportional term every predetermined time (for example, per 8 milliseconds) after the control starts, and then adjusts the opening degree of the variable nozzle vane mechanism 141 based on the updated supercharging efficiency feedback proportional term. During the control based on the supercharging efficiency feedback proportional term, the engine ECU 10 calculates a learning value of control with the supercharging efficiency feedback proportional term, that is, the integral term (hereinafter referred to as supercharging efficiency feedback integral term) that accumulates a remaining deviation between the control amount of the opening degree and the target control amount thereof. When the calculated supercharging efficiency feedback integral term is equal to or greater than a given value, the engine ECU 10 adjusts the opening degree of the variable nozzle vane mechanism 141 based on the supercharging efficiency feedback integral term.

In this way, the opening degree of the variable nozzle vane mechanism 141 is adjusted based on the supercharging efficiency feedback proportional term, when the deviation between the target supercharging pressure and the actual supercharging pressure of the engine 100 is large. This makes it possible to bring the actual supercharging pressure closer to the target supercharging pressure. Also, the opening degree of the variable nozzle vane mechanism 141 is adjusted based on the supercharging efficiency feedback integral term, when the deviation between the target supercharging pressure and the actual supercharging pressure of the engine 100 is small. This makes it possible for the actual supercharging pressure to suitably converge to the target supercharging pressure.

While performing the F/B control, the engine ECU 10 performs the F/F control that restricts the change rates of the target phases of the electric VVT mechanism 26 and the hydraulic VVT mechanism 27 based on the supercharging efficiency feedback proportional term and the supercharging efficiency feedback integral term. Additionally, in the present embodiment, the change rate of the target phase means a change amount of the target phase of the intake valve 22 or the exhaust valve 23 for a given period (that is, the speed of change).

The engine ECU 10 calculates the target values (basic target phases) of the valve timings of the intake valve 22 and the exhaust valve 23 based on the rotational number and the fuel injection amount of the engine 100. Next, the engine ECU 10 restricts the change amount of the target phase for a predetermined period until the actual phase reaches the basic target value to the change amount of the target phase calculated based on the supercharging efficiency feedback proportional term and the supercharging efficiency feedback integral term.

Figure 4:
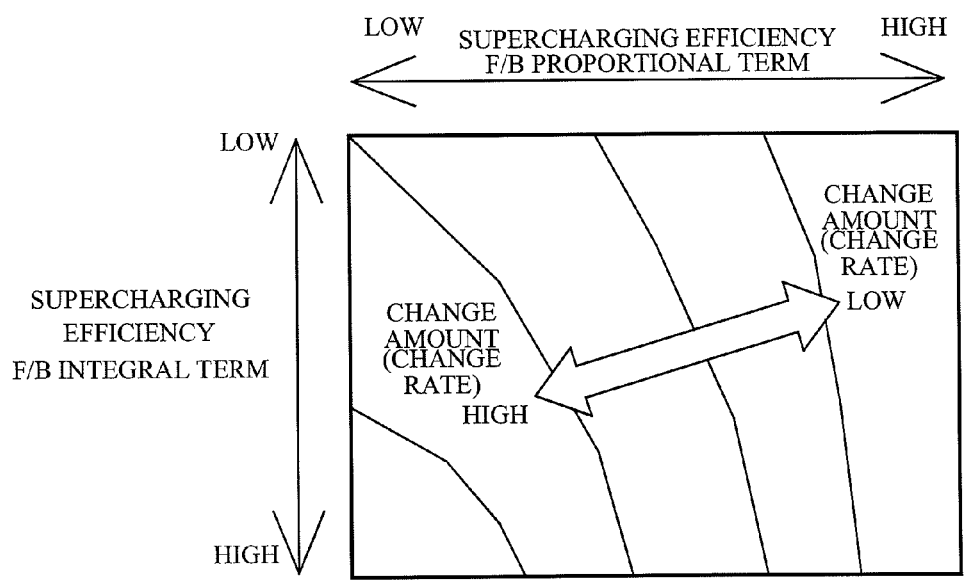
FIG. 4 is a change rate restriction map of target phases of the electric VVT mechanism and the hydraulic VVT mechanism based on a proportional term and an integral term.

FIG. 4 illustrates a change rate restriction map of the target phases of the electric VVT mechanism 26 and the hydraulic VVT mechanism 27 based on the proportion term and the integral term. The engine ECU 10 checks the supercharging efficiency feedback proportional term and the supercharging efficiency feedback integral term every predetermined time (for example, per 8 milliseconds) after starting the control. Next, the engine ECU 10 updates the change amounts (speed of change) of the target phases of the intake valve 22 and the exhaust valve 23 for every predetermined period (for example, per 8 milliseconds) based on the checked supercharging efficiency feedback proportional term and supercharging efficiency feedback integral term. Specifically, the engine ECU 10 reduces the change amount of the target phase for a predetermined period as the supercharging efficiency feedback proportional term is larger. The engine ECU 10 increases the change amount of the target phase for a predetermined period as the supercharging efficiency feedback integral term is smaller.

Returning to FIG. 3, the engine ECU 10 instructs to change the valve timings of the electric VVT mechanism 26 and the hydraulic VVT mechanism 27 based on the calculated target phases, thereby changing the phases of the intake valve 22 and the exhaust valve 23 to the target phases. The engine ECU 10 updates the target phase every predetermined time until the F/B control of the variable nozzle vane mechanism 141 converges, and changes the valve timing to the basic target phase. The engine ECU 10 repeats the above processes until the driving of the engine 100 is finished.

In the control of the supercharging efficiency by the variable nozzle vane mechanism 141, a time lag between when the physical value changes and when the combustion is improved is larger than that of the other control. On the other hand, in the control of the valve timings by the electric VVT mechanism 26 and the hydraulic VVT mechanism 27, a time lag between when the physical value changes and when the combustion is improved is smaller than that of the other control. Therefore, when both the control processes are performed in parallel, the suitable relationship between the supercharging pressure and the compression ratio deteriorates, because of a large difference between the time lags between when the control starts and when the control contributes to the combustion. That is, the F/B control of the variable nozzle vane mechanism 141 and the F/F control of the electric VVT mechanism 26 and the hydraulic VVT mechanism 27 interfere with each other, so that the emission of the engine 100 deteriorates.

Thus, in the engine system 1 of the present embodiment, the F/F control of the electric VVT mechanism 26 and the hydraulic VVT mechanism 27 is performed based on the convergence state of the F/B control of the variable nozzle vane mechanism 141. This suppresses the mutual interference of the F/B control of the variable nozzle vane mechanism 141 with the F/F control of the electric VVT mechanism 26 and the hydraulic VVT mechanism 27, there being a difference between the F/B control and the F/F control in the time lag between when the control starts and when the control contributes to the combustion. In this case, the F/F control of the electric VVT mechanism 26 and the hydraulic VVT mechanism 27 is performed based on the proportional term and the integral term directly used for the F/B control of the variable nozzle vane mechanism 141, whereby the F/B control and the F/F control suitably cooperate with each other. Also, the F/F control is performed in consideration of both the proportional term and the integral term, thereby suitably suppressing hunting caused by the mutual interference of the F/B control with the F/F control. Additionally, in the present embodiment, the F/F control is performed in consideration of both the proportional term and the integral term used for the F/B control of the variable nozzle vane mechanism 141. However, the F/F control may be performed in consideration of any one of the proportional term and the integral term.

Moreover, the engine ECU 10 prohibits the target phases of the intake valve 22 and the exhaust valve 23 from changing, while the supercharging efficiency feedback proportional term is greater than a first predetermined threshold and the supercharging efficiency feedback integral term is smaller than a second predetermined threshold. Herein, the first threshold according to the proportional term and the second threshold according to the integral term are used to determine that there is a high possibility of delaying the response of the supercharging pressure by the turbocharger 14, and may be any values tested beforehand.

At the beginning of the F/B control of the variable nozzle vane mechanism 141, the turbocharger 14 delays a response of the supercharging pressure. Thus, while the response of the supercharging pressure is being delayed, that is, while the supercharging efficiency feedback proportional term is greater than the first predetermined threshold and the supercharging efficiency feedback integral term is smaller than the second predetermined threshold, the target phase is prohibited from changing. This makes it possible to perform the F/F control of the electric VVT mechanism 26 and the hydraulic VVT mechanism 27 in consideration of the response delay of the supercharging pressure occurring at the beginning of the F/B control of the variable nozzle vane mechanism 141. It is therefore possible for the F/B control and the F/F control to suitably cooperate with each other, thereby suppressing the mutual interference of the plural control processes.

Further, the engine ECU 10 changes the target phase such that the F/F control of the electric VVT mechanism 26 and the hydraulic VVT mechanism 27 converges, after the F/B control of the variable nozzle vane mechanism 141 converges. That is, the target phase is changed so as to finish a change in the phases of the intake valve 22 and the exhaust valve 23, after the actual supercharging pressure converges to the target supercharging pressure by the turbocharger 14.

Because the turbocharger 14 has a variation in the response resulting from the individual difference or the deterioration, there is a high possibility that the hunting is caused by the mutual interference with another control in a high supercharging pressure region greatly influenced by the variation. Therefore, the timings of the convergences of the F/F control of the electric VVT mechanism 26 and the hydraulic VVT mechanism 27 are later than that of the F/B control, thereby suppressing the mutual interference of the F/B control with the F/F control in the high supercharging pressure region. In this way, it is possible to perform the F/F control in consideration of the variation in response resulting from the individual difference or the deterioration of the turbocharger 14.

As mentioned above, in the engine system 1 of the present embodiment, the F/F control is performed to restrict the change rates of the target phases of the intake valve 22 and the exhaust valve 23 based on the proportional term and the integral term used for the F/B control of the variable nozzle vane mechanism 141. This can suitably suppress the mutual interference of the F/B control of the variable nozzle vane mechanism 141 with the F/F control of the electric VVT mechanism 26 and the hydraulic VVT mechanism 27.

Figure 5:
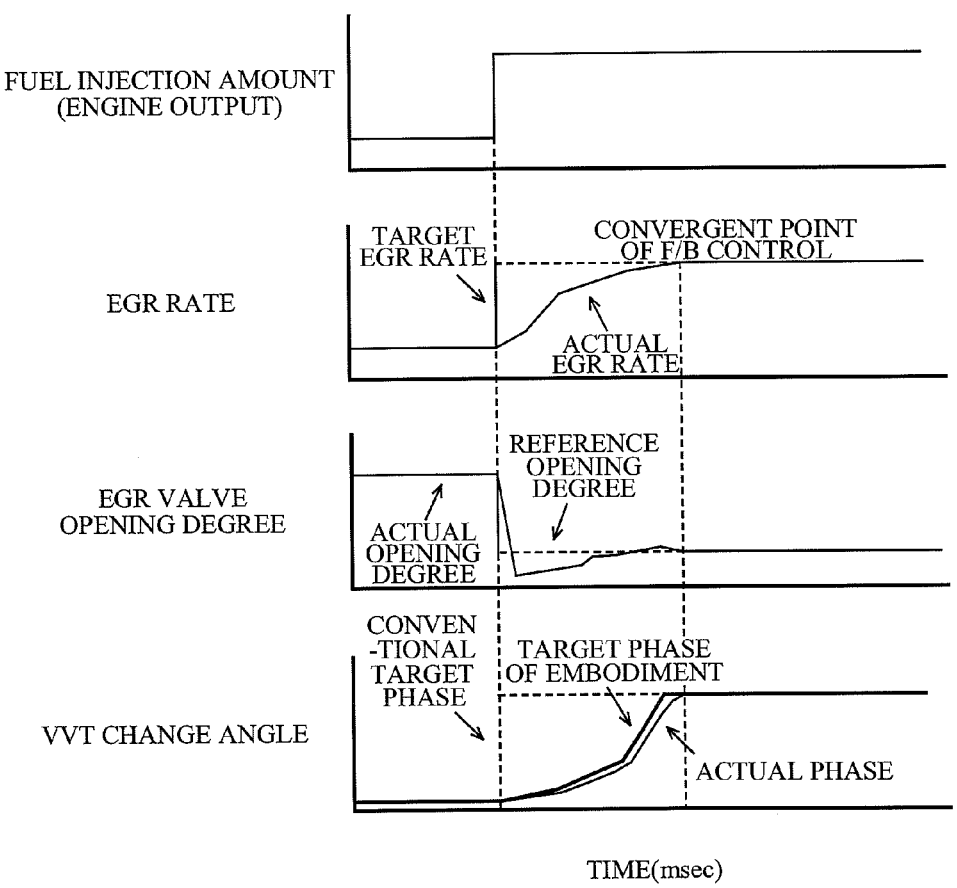
FIG. 5 illustrates an example of the F/F control of the electric VVT mechanism and the hydraulic VVT mechanism based on the F/B control of an EGR valve.

Next, a description will be given of the F/B control of the EGR valve 162 and the F/F control of the electric VVT mechanism 26 and the hydraulic VVT mechanism 27 in the engine system 1 of the present embodiment. FIG. 5 illustrates an example of the F/F control of the electric VVT mechanism 26 and the hydraulic VVT mechanism 27 based on the F/B control of the EGR valve 162.

When the output of the engine 100 is requested to be changed, for example, when the vehicle accelerates or runs up a slope, the engine ECU 10 calculates the target values of the fuel injection amount, the EGR rate, and the valve timings of the intake valve 22 and the exhaust valve 23 based on the requested outputs. Subsequently, the engine ECU 10 controls the injector 17, the EGR valve 162, the electric VVT mechanism 26, and the hydraulic VVT mechanism 27 based on the calculated target values.

In the present embodiment, the opening degree of the EGR valve 162 is adjusted based on the deviation between the target value of the EGR rate (target EGR rate) and the actual value (actual EGR rate), and this makes it possible to perform the F/B control which brings the EGR rate of the engine 100 closer to the target value. Firstly, when the output of the engine 100 is requested to be changed, the engine ECU 10 sets the target opening degree (hereinafter referred to as reference opening degree) of the EGR valve 162 based on the deviation between the target EGR rate and the actual EGR rate. Subsequently, the engine ECU 10 adjusts the opening degree of the EGR valve 162 to have a preset reference opening degree, and then controls the EGR amount. The engine ECU 10 updates the reference opening degree based on the deviation between the target EGR rate and the actual EGR rate every predetermined time (for example, per 8 milliseconds) after the control starts, and then adjusts the opening degree of the EGR valve 162 based on the updated reference opening degree.

In this case, like the F/B control of the variable nozzle vane mechanism 141, the F/B control which adjusts the opening degree of the EGR valve 162 may be performed by PI control using the proportional term and the integral term.

While performing the F/B control, the engine ECU 10 performs the F/F control that restricts the change rate of the target phases of the electric VVT mechanism 26 and the hydraulic VVT mechanism 27 based on the deviation (control deviation) between the target EGR rate and the actual EGR rate of the EGR valve 162 and the deviation (opening degree deviation) between the reference opening degree and the actual opening degree.

The engine ECU 10 calculates the target values (basic target phases) of the valve timings of the intake valve 22 and the exhaust valve 23 based on the rotational number and the fuel injection amount of the engine 100. Next, the engine ECU 10 restricts the change amount of the target phase for a predetermined period until the actual phase reaches the basic target value to the change amount of the target phase calculated based on the control deviation and the opening degree deviation of the EGR valve 162.

Figure 6:
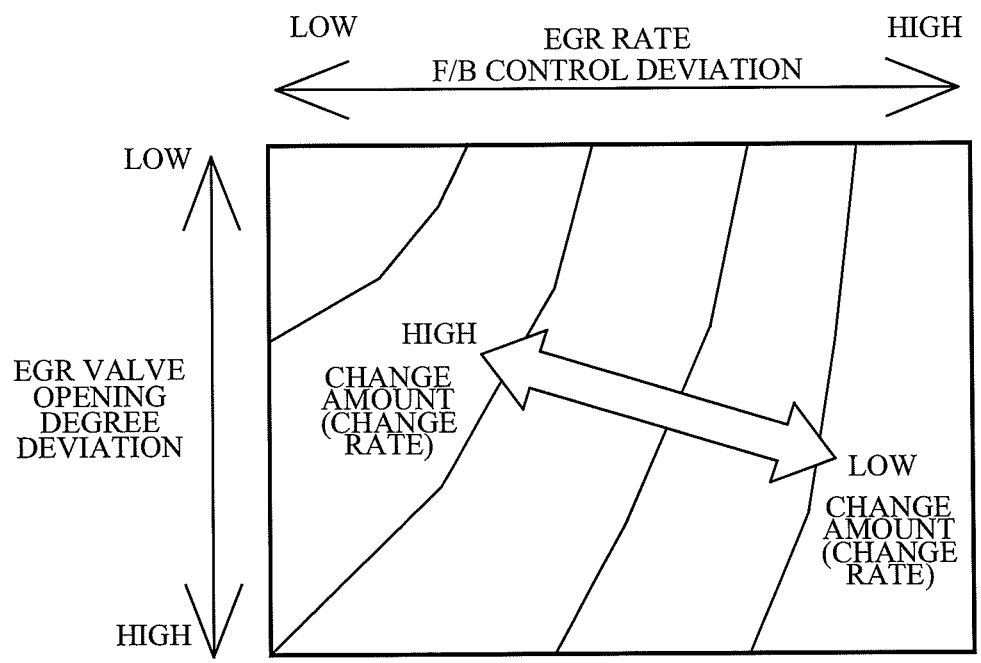
FIG. 6 illustrates a change rate restriction map of target phases of the electric VVT mechanism and the hydraulic VVT mechanism based on a control deviation and an opening degree deviation of the EGR valve.

FIG. 6 illustrates a change rate restriction map of the target phases of the electric VVT mechanism 26 and the hydraulic VVT mechanism 27 based on the control deviation and the opening degree deviation of the EGR valve 162. The engine ECU 10 checks the control deviation and the opening degree deviation of the EGR valve 162 every predetermined time (for example, per 8 milliseconds) after starting the control. Next, the engine ECU 10 updates the change amounts (speed of change) of the target phases of the intake valve 22 and the exhaust valve 23 for a predetermined period (for example, per 8 milliseconds) based on the checked control deviation and opening degree deviation of the EGR valve 162. Specifically, the engine ECU 10 reduces the change amount of the target phase for a predetermined period as the control deviation and the opening deviation of the EGR valve 162 are larger. The engine ECU 10 increases the change amount of the target phase for a predetermined period as the control deviation and the opening deviation of the EGR valve 162 are smaller.

Returning to FIG. 5, the engine ECU 10 instructs to change the valve timings of the electric VVT mechanism 26 and the hydraulic VVT mechanism 27 based on the calculated target phases, thereby changing the phases of the intake valve 22 and the exhaust valve 23 into the target phases. The engine ECU 10 updates the target phase every predetermined time until the F/B control of the EGR valve 162 converges, and then change the valve timing into the basic target phase. The engine ECU 10 repeats the above processes until the driving of the engine 100 is finished.

In the control of the EGR rate by the EGR valve 162, a time lag between when the physical value changes and when the combustion is improved is larger than that of the control of the valve timings by the electric VVT mechanism 26 and the hydraulic VVT mechanism 27. Therefore, when the both control is performed in parallel, the suitable relationship between the supercharging pressure and the compression ratio deteriorates, because of a large difference between the time lags between when the control starts and when the control contributes to the combustion. That is, the F/B control of the EGR valve 162 and the F/F control of the electric VVT mechanism 26 and the hydraulic VVT mechanism 27 interfere with each other, so that the emission of the engine 100 deteriorates.

Thus, in the engine system 1 according to the present embodiment, the F/F control of the electric VVT mechanism 26 and the hydraulic VVT mechanism 27 is performed based on a convergence state of the F/B control of the EGR valve 162. This suppresses the mutual interference of the F/B control of the EGR 162 with the F/F control of the electric VVT mechanism 26 and the hydraulic VVT mechanism 27, there being a difference between the F/B control and the F/F control in the time lag between when the control starts and when the control contributes to the combustion.

Also, the response delay of the F/B control of the EGR valve 162 is smaller than the response delay of the F/B control of the variable nozzle vane mechanism 141. Moreover, the F/B control of the EGR valve 162 is performed in the supercharging pressure region lower than the supercharging pressure region in which the F/B control of the variable nozzle vane mechanism 141 is performed. Therefore, a passivity that the F/B control of the EGR valve 162 interferes with the other control is lower than a possibility that the F/B control of the variable nozzle vane mechanism 141 interferes with the other control. Thus, the F/F control converges to correspond to the convergence of the F/B control of the EGR valve 162, thereby suitably cooperating the F/B control and the F/F control. Also, the F/F control is performed in consideration of both the control deviation and the opening degree deviation of the EGR valve 162, thereby performing the F/F control in consideration of the variation in response caused by the individual difference or the deterioration of the EGR valve. It is therefore possible for the F/B control of the EGR valve 162 and the F/F control of the electric VVT mechanism 26 and the hydraulic VVT mechanism 27 to suitably cooperate with each other, thereby suppressing the mutual interference of the plural control processes. Additionally, in the present embodiment, the F/F control is performed in consideration of both the control deviation and the opening degree deviation of the EGR valve 162, but the F/F control may be performed in consideration of any one of the control deviation and the opening degree deviation.

Figure 7:
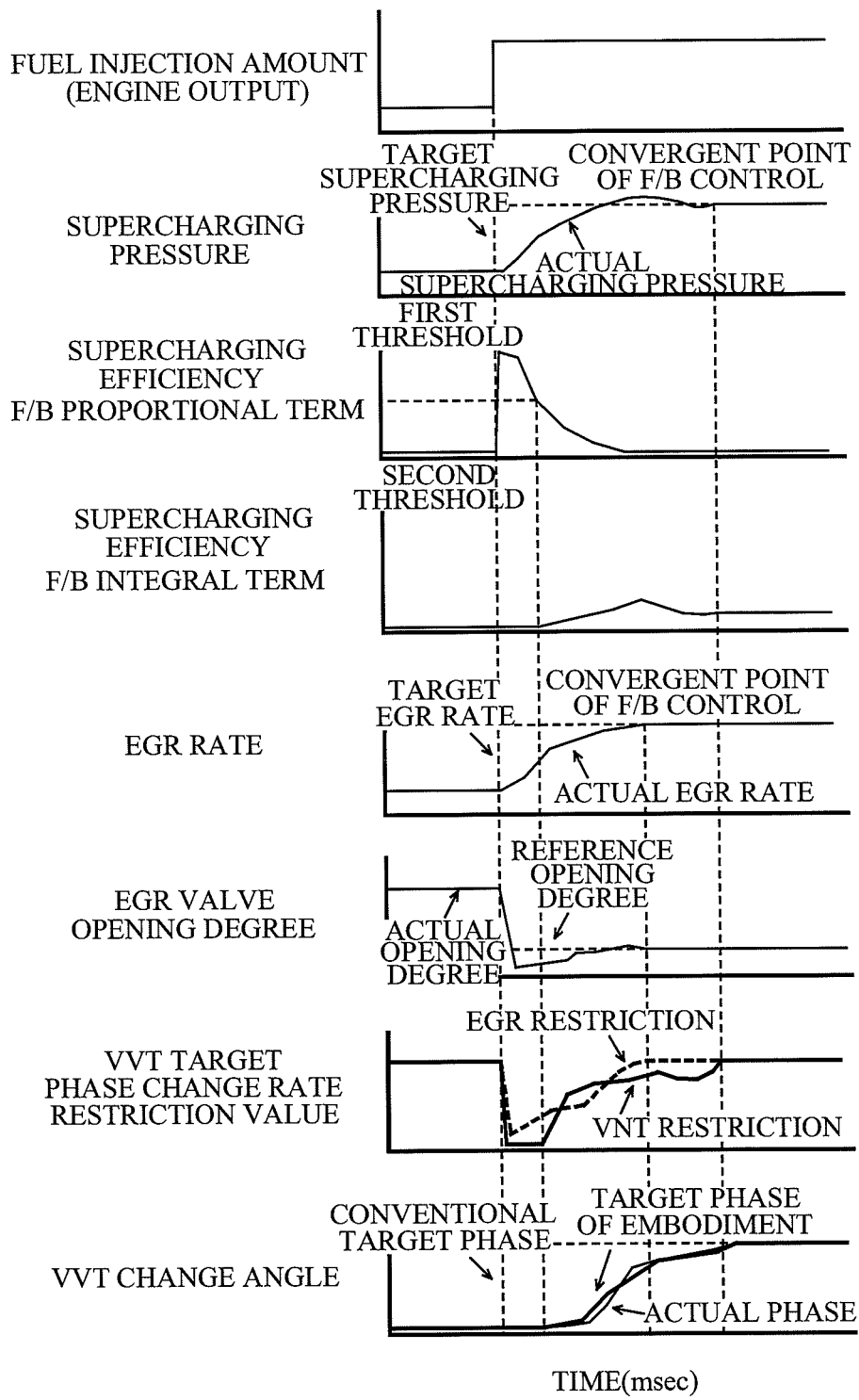
FIG. 7 illustrates an example of the F/F control of the electric VVT mechanism and the hydraulic VVT mechanism based on the F/B control of the variable nozzle vane mechanism and the EGR valve.

Next, a description will be given of the F/B control of the variable nozzle vane mechanism 141 and the EGR valve 162, and the F/B control of the electric VVT mechanism 26 and the hydraulic VVT mechanism 27 in the engine system 1 of the present embodiment. FIG. 7 illustrates an example of the F/F control of the electric VVT mechanism 26 and the hydraulic VVT mechanism 27 based on the variable nozzle vane mechanism 141 and the EGR valve 162.

When the output of the engine 100 is requested to be changed, for example, when the vehicle accelerates or runs up a slope, the engine ECU 10 calculates the target values of the fuel injection amount, the supercharging pressure, the EGR rate, and the valve timings of the intake valve 22 and the exhaust valve 23 based on the requested outputs. Subsequently, the engine ECU 10 controls the injector 17, the variable nozzle vane mechanism 141, the EGR valve 162, the electric VVT mechanism 26, and the hydraulic VVT mechanism 27 based on the calculated target values.

While performing the F/B control of the variable nozzle vane mechanism 141 and the EGR valve 162, the engine ECU 10 performs the F/F control which restricts the change rate of the target phases of the electric VVT mechanism 26 and the hydraulic VVT mechanism 27. Additionally, explanation of the above mentioned F/B control of the variable nozzle vane mechanism 141 and the EGR valve 162 is omitted.

The engine ECU 10 calculates the target values (basic target phases) of the valve timings of the intake valve 22 and the exhaust valve 23 based on the requested outputs of the engine 100. Next, the engine ECU 10 restricts the change amount of the target phase for a predetermined period until the actual phase reaches the basis target value to the change amount of the target phase calculated based on the supercharging efficiency feedback proportional term and the supercharging efficiency feedback integral term, or the control deviation and the opening degree deviation of the EGR valve 162.

Specifically, the engine ECU 10 calculates the change amount of the target phase based on the proportional term and the integral term used in the F/B control of the variable nozzle vane mechanism 141 (see FIG. 4). Also, the engine ECU 10 calculates the change amount of the target phase based on the control deviation and the opening degree deviation of the EGR valve 162 (see FIG. 6). Next, the engine ECU 10 adopts a smaller one of the calculated change amounts as a change rate restriction value of the target phases of the intake valve 22 and the exhaust valve 23 (see FIG. 7).

The engine ECU 10 instructs to change the valve timings of the electric VVT mechanism 26 and the hydraulic VVT mechanism 27 based on the calculated change rate restriction value of the target phases, thereby changing the valve timings of the intake valve 22 and the exhaust valve 23 into the target phases. The engine ECU 10 updates the target phase every predetermined time until the F/B control of the variable nozzle vane mechanism 141 and the EGR valve 162 converges, and changes the valve timing into the basic target phase. The engine ECU 10 repeats the above processes until the driving of the engine 100 is finished.

Figure 8:
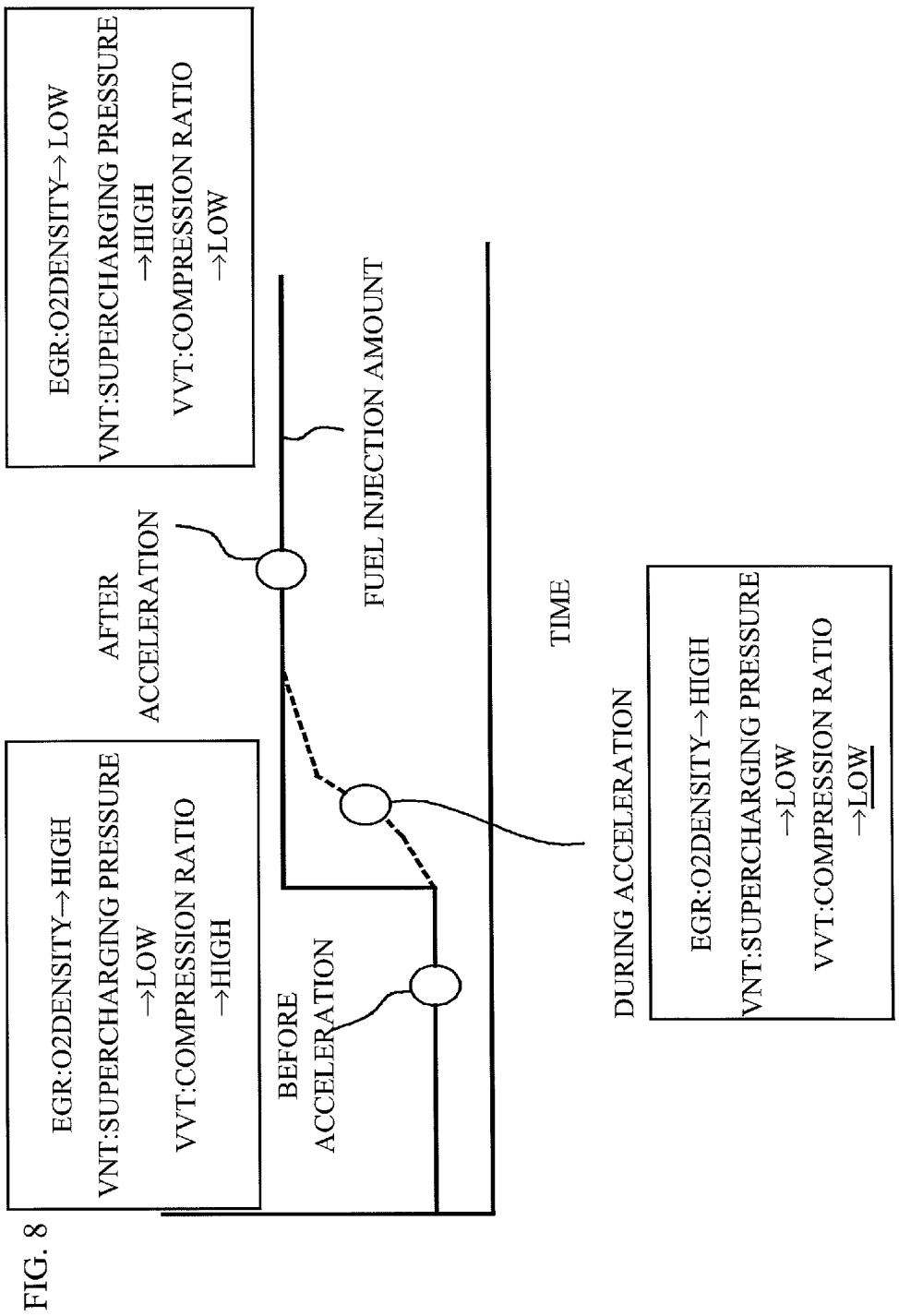
FIG. 8 illustrates engine control in accelerating a vehicle in prior art.

FIG. 8 illustrates the engine control in accelerating a vehicle in conventional art. Before the acceleration of the vehicle is requested, the supercharging pressure of the engine is low, an oxygen density is high, and a compression ratio of the combustion chamber is high. After the acceleration of the vehicle is requested, the variable nozzle vane mechanism, the EGR valve, the electric VVT mechanism, and the hydraulic VVT mechanism are controlled in parallel such that the supercharging pressure of the engine is high, and the oxygen density is low, and the compression ratio of the combustion chamber is low. Just after the electric VVT mechanism and the hydraulic VVT mechanism are controlled, the compression ratio of the combustion chamber changes. On the other hand, there is a predetermined time lag between when the variable nozzle vane mechanism and the EGR valve start to be controlled and when the supercharging pressure and the oxygen density of the engine change. In such a way, there is a difference between the time lags between when the control starts and when the combustion is influenced, so that the conventional engine control processes interfere with each other during the vehicle acceleration. This may degrade the emission.

On the other hand, in the engine system 1 of the present embodiment, the F/F control of the valve timings of the intake valve 22 and the exhaust valve 23 is restricted based on the convergence state of the other F/B control, the above F/F control having a time lag between when the physical value changes and when the combustion is improved is smaller than that of the other control. This can suppress the hunting caused by the interference of the control processes with each other, even when the plural control processes having a different time lag between when the control starts and when the control contributes to the combustion are performed in parallel.

Figure 9:
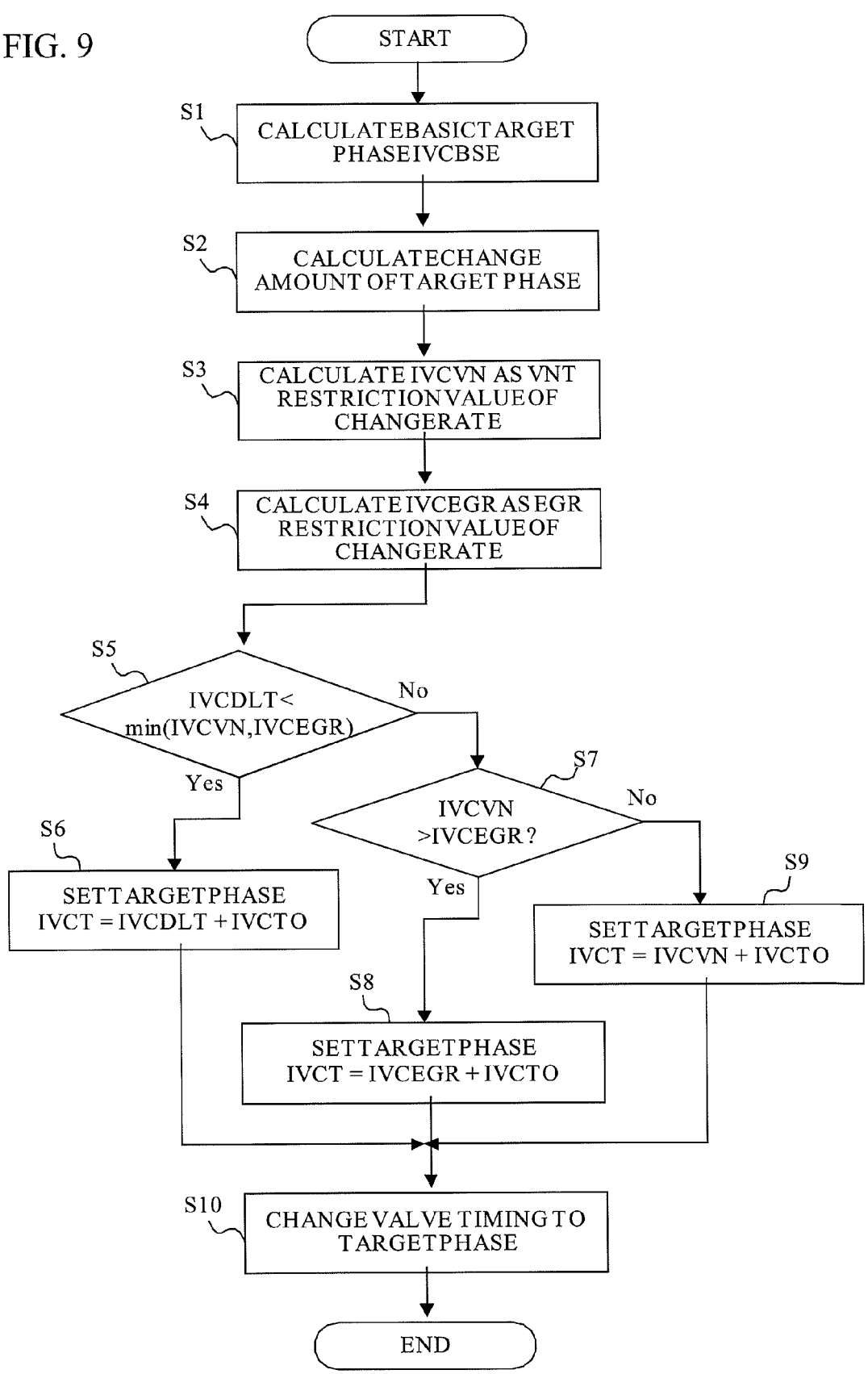
FIG. 9 is a flowchart of an example of processes of an engine ECU.

Next, a description will be given of the operation of the engine system 1 with reference to the control by the engine ECU 10. FIG. 9 is a flowchart of an example of the processes of the engine ECU 10. In the engine system 1 of the present embodiment, the engine ECU 10 performs the F/F control which restricts the change rates of the target phases of the intake valve 22 and the exhaust valve 23 based on the convergence state of the F/B control of the variable nozzle vane mechanism 141 and the EGR valve 162. Additionally, the valve timing control of the intake valve 22 will be explained in this flowchart, and the valve timing control of the intake valve 22 is controlled in the same manner.

When an ignition switch is turned ON to start the engine 100, the engine 100 repeats the following processes every predetermined time (for example, per 8 milliseconds) while the engine 100 is being driven.

Firstly, in step S1, the engine ECU 10 calculates the target valve of the valve timing of the intake valve 22 (basic target phase (IVCBSE)) based on the rotational number and the fuel injection amount of the engine 100. When finishing the process of step S1, the engine ECU 10 proceeds to next step S2.

In step S2, the engine ECU 10 determines the change amount of the target phase (IVCDLT) based on the difference between the basic target phase of the intake valve 22 calculated in step S1 and the target phase previously calculated (IVCTO). When finishing the process of step S2, the engine ECU 10 proceeds to next step S3.

In step S3, the engine ECU 10 determines the change amount of the target phase (IVCVN) based on the proportional term and the integral term used for the F/B control of the variable nozzle vane mechanism 141 (see FIG. 4). When finishing the process of step S3, the engine ECU 10 proceeds to next step S4.

In step S4, the engine ECU 10 determines the change amount of the target phase (IVCEGR) based on the control deviation and the opening degree deviation in the F/B control of the EGR valve 162 (see FIG. 6). When finishing the process of step S4, the engine ECU 10 proceeds to next step S5.

In step S5, the engine ECU 10 determines whether or not the change amount of the target phase calculated in step S2 (IVCDLT) is smaller than a smaller one of the change amount of the target phase calculated in step S3 (IVCVN) and the change amount of the target phase calculated in step S4 (IVCEGR). When the IVCDLT is larger than the IVCVN or the IVCEGR (step S5/NO), the engine ECU 10 determines that the change rate of the target phase of the intake valve 22 should be restricted, and then proceeds to step S7. When the IVCDLT is smaller than the IVCVN or the IVCEGR (step S5/YES), the engine ECU 10 determines that the change rate of the target phase of the intake valve 22 should not be restricted, and then proceeds to step S6.

In step S6, the engine ECU 10 sets the sum (in other words, IVCBSE) of the IVCDLT and the IVCTO as the target phase (IVCT) of the intake valve 22. When finishing the process of step S6, the engine ECU 10 proceeds to step S10.

When a negative determination is made in step S5, the engine ECU 10 proceeds to step S7. In step S7, the engine ECU 10 determines whether or not the change rate of the target phase calculated in step S3 (IVCVN) is larger than the change rate of the target phase calculated in step S4 (IVCEGR). When the IVCVN is not larger than the IVCEGR (step S7/NO), the engine ECU 10 proceeds to step S9. When the IVCVN is larger than the IVCEGR (step S7/YES), the engine ECU 10 proceeds to next step S8.

In step S8, the engine ECU 10 sets the sum of the IVCEGR and the IVCTO as the target phase of the intake valve 22 (IVCT). That is, the change rate of the target phase of the intake valve 22 is restricted to the IVCEGR. When finishing the process of step S8, the engine ECU 10 proceeds to step S10.

When a negative determination is made in step S7, the engine ECU 10 proceeds to step S9. In step S9, the engine ECU 10 sets the sum of the IVCVN and the IVCTO as the target phase of the intake valve 22 (IVCT). That is, the change rate of the target phase of the intake valve 22 is restricted to the IVCVN. When finishing the process of step S9, the engine ECU 10 proceeds to next step S10.

When finishing the process of step S6, step S8, or step S9, the engine ECU 10 proceeds to step S10. In step S10, the engine ECU 10 instructs the electric VVT mechanism 26 such that the phase of the intake valve 22 is changed to the target phase set in step S6, step S8, or step S9 (IVCT). When finishing the process of step S10, the engine ECU 10 finishes the processes of the control.

The above control is performed to achieve the F/B control and the F/F control in consideration of the time lag between when each control starts and when each control contributes to the combustion. It is therefore possible to suppress the mutual interference of the plural control in the engine 100. Additionally, the engine ECU 10 may cause one of the processes of step S3 and step S4 to precede the other, and may perform both the processes at the same time.

As mentioned above, the engine system of the present embodiment includes the engine including: the electric VVT mechanism and the hydraulic VVT mechanism changing the phases of the opening and the closing of the intake valve and the exhaust valve into target phases; the EGR valve adjusting an exhaust gas recirculation amount recirculated from the exhaust side to the intake side; and the variable nozzle vane mechanism controlling the supercharging efficiency of the turbocharger. The engine performs the F/B control of the EGR valve and the variable nozzle vane mechanism and the F/F control of the electric VVT mechanism and the hydraulic VVT mechanism. Further, the engine ECU changes the target phases of the electric VVT mechanism and the hydraulic VVT mechanism based on the driving state of the engine, and performs the F/F control which restricts the charge rate of the target phase based on the convergence states of the F/B control of the EGR valve and the variable nozzle vane mechanism. This can suppress the mutual interference of the plural control processes in the engine.

Furthermore, the engine system of the present embodiment performs the F/F control which restricts the target phase based on the proportional term and the integral term used in the variable nozzle vane mechanism 141 and the control deviation and the opening degree deviation of the F/B control of the EGR valve 162. It is therefore possible to achieve the F/B control and the F/F control in consideration of the time lag between when the control starts and when the control contributes to the combustion.

Moreover, the engine system of the present embodiment prohibits the target phase from changing, when the first supercharging efficiency feedback proportional term is larger than the first threshold and the supercharging efficiency feedback integral term is smaller than the second threshold. In addition, the engine system of the present embodiment performs the F/F control which reduces the change rate of the target phase as the deviation between the target EGR rate and the actual EGR rate of the engine increases or the deviation between the reference opening degree and the actual opening degree of the EGR valve increases. This can make the F/B control and the F/F control of the engine suitably cooperate with each other.

While the exemplary embodiments of the present invention have been illustrated in detail, the present invention is not limited to the above-mentioned embodiments, and other embodiments, variations and modifications may be made without departing from the scope of the present invention.

For example, the F/F control may be performed to restrict the change rates of the target phases of the intake valve 22 and the exhaust valve 23 based on the convergence state of the F/B control of the diesel throttle 19. Also, the F/F control may be performed to restrict the change rates of the target phases of the intake valve 22 and the exhaust valve 23 based on the convergence state of the other F/B control of the engine 100.

DESCRIPTION OF LETTERS OR NUMERALS 1 engine system
10 engine ECU
14 turbocharger (supercharger)
16 EGR path
17 injector
19 diesel throttle
22 intake valve
23 exhaust valve
26 electric VVT mechanism (variable valve timing portion)
27 hydraulic VVT mechanism (variable valve timing portion)
100 engine
141 variable nozzle vane mechanism (a supercharging efficiency control portion)
162 EGR valve (EGR valve)

The invention claimed is:

1. A control device for an internal combustion engine comprising:
 a variable valve timing portion changing a phase of opening and closing of each of an intake valve and an exhaust valve into a target phase;
 an EGR valve adjusting an exhaust gas recirculation amount recirculated from an exhaust side to an intake side;
 a supercharging efficiency control portion controlling a supercharging efficiency of a supercharger;
 a throttle valve adjusting an intake air amount; and
 the internal combustion engine feedback-controls at least two of the EGR valve, the supercharging efficiency control portion, and the throttle valve, and feedforward-controls the variable valve timing portion,
 wherein the feedforward control changes the target phase of the variable valve timing portion based on a driving state of the internal combustion engine, and restricts a change rate of the target phase based on convergence states of the feedback control of at least two of the EGR valve, the supercharging efficiency control portion, and the throttle valve.

2. The control device for the internal combustion engine of claim 1, wherein
 the internal combustion engine feedback-controls the EGR valve and the supercharging efficiency control portion, and
 the feedforward control restricts the change rate of the target phase based on the convergence states of the feedback control of the EGR valve and the supercharging efficiency control portion.

3. The control device for the internal combustion engine of claim 2, wherein
 the internal combustion engine feedback-controls the supercharging efficiency control portion based on a supercharging efficiency feedback proportional term which is proportional to a deviation between a target supercharging pressure and an actual supercharging pressure, and based on a supercharging efficiency feedback integral term which is a learning value of a control based on the supercharging efficiency feedback proportional term, and
 the feedforward control restricts the change rate of the target phase based on the supercharging efficiency feedback proportional term or the supercharging efficiency feedback integral term.

4. The control device for the internal combustion engine of claim 3, wherein the feedforward control prohibits the target phase from changing, when the supercharging efficiency feedback proportional term is greater than a first threshold and the supercharging efficiency feedback integral term is smaller than a second threshold.

5. The control device for the internal combustion engine of claim 2, wherein
 the internal combustion engine feedback-controls the EGR valve to change an actual opening degree of the EGR valve based on a reference opening degree which is changed with a deviation between a target EGR rate and an actual EGR rate, and
 the feedforward control restricts the change rate of the target phase based on the deviation between the target EGR rate and the actual EGR rate or the deviation between the reference opening degree of the EGR valve and the actual opening degree of the EGR valve.

6. The control device for the internal combustion engine of claim 5, wherein the feedforward control reduces the change rate of the target phase as the deviation between the target EGR rate and the actual EGR rate of the internal combustion engine or as the deviation between the reference opening degree of the EGR valve and the actual opening degree of the EGR valve is greater.

* * * * *